(12) United States Patent
He et al.

(10) Patent No.: US 11,953,538 B2
(45) Date of Patent: Apr. 9, 2024

(54) METHOD AND SYSTEM FOR PREDICTING INSULATED GATE BIPOLAR TRANSISTOR LIFETIME BASED ON COMPOUND FAILURE MODE COUPLING

(71) Applicant: WUHAN UNIVERSITY, Hubei (CN)

(72) Inventors: Yigang He, Hubei (CN); Lie Li, Hubei (CN); Liulu He, Hubei (CN); Xiao Wang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/496,786

(22) Filed: Oct. 8, 2021

(65) Prior Publication Data
US 2022/0341986 A1    Oct. 27, 2022

(30) Foreign Application Priority Data
Apr. 20, 2021 (CN) .......................... 202110425367.8

(51) Int. Cl.
*G01R 31/26* (2020.01)

(52) U.S. Cl.
CPC ..... *G01R 31/2608* (2013.01); *G01R 31/2642* (2013.01)

(58) Field of Classification Search
None
See application file for complete search history.

(56) References Cited

U.S. PATENT DOCUMENTS

2018/0017613 A1* 1/2018 Qiao ................. G01R 31/2619
2021/0063466 A1* 3/2021 Zhang .................... G01R 31/70

FOREIGN PATENT DOCUMENTS

CN    112487651 A * 3/2021

* cited by examiner

*Primary Examiner* — Huy Q Phan
*Assistant Examiner* — Haidong Zhang
(74) *Attorney, Agent, or Firm* — JCIPRNET

(57) ABSTRACT

A method and system for predicting an insulated gate bipolar transistor (IGBT) lifetime based on compound failure mode coupling are provided. First, a simultaneous failure probability model of a bonding wire and a solder layer is calculated. Next, expectancy of the simultaneous failure probability model is calculated and recorded as a lifetime under a coupling effect. A coupling function relation is established. A lifetime of the solder layer and a lifetime of the bonding wire are predicted. An IGBT lifetime prediction model not taking the coupling effect into account is established. An IGBT lifetime prediction model taking the coupling effect into account is established. In the disclosure, the lifetime of the IGBT module under the coupling effect of the solder layer and the bonding wire may be accurately predicted.

14 Claims, 2 Drawing Sheets

METHOD AND SYSTEM FOR PREDICTING INSULATED GATE BIPOLAR TRANSISTOR LIFETIME BASED ON COMPOUND FAILURE MODE COUPLING

CROSS-REFERENCE TO RELATED APPLICATION

This application claims the priority benefit of China application serial no. 202110425367.8, filed on Apr. 20, 2021. The entirety of the above-mentioned patent application is hereby incorporated by reference herein and made a part of this specification.

BACKGROUND

Technical Field

The disclosure relates to the technical field of insulated gate bipolar transistor (IGBT) lifetime prediction, and in particular, relates to a method and system for predicting an IGBT lifetime based on compound failure mode coupling.

Description of Related Art

At present, as being treated as an important power semiconductor switch in the electrical field, the insulated gate bipolar transistors (IGBTs) have been widely used in many fields including rail transit, smart grid, aerospace, electric vehicles, and new energy equipment and have also been widely applied in numerous technical fields especially in the fields of clean energy and flexible direct current (DC) transmission. Since an IGBT is a power switch controlled by voltages, the IGBT have to withstand voltages of hundreds or even thousands of volts during operation most of the time. In a working environment of high voltage and high power, the insulation performance of an IGBT module package is highly demanded, but this type of environment also causes the IGBT to generate tremendous losses during operation most of the time. These losses are transferred outside in the form of heat energy, which increases the temperature of the IGBT chip and reduces the reliability of the IGBT module.

The lifetime prediction of an IGBT module is an important issue in the research of reliability. Currently, the lifetime prediction models may be divided into two categories, namely empirical lifetime models and physical lifetime models. An empirical lifetime model obtains historical data through experiments, uses the data to fit a formula containing undetermined coefficients, and finally obtains an empirical model for lifetime prediction. The Bayerer model proposed by Bayerer has the highest prediction accuracy because the model takes factors, such as the maximum junction temperature, junction temperature fluctuations, heating time, load DC current, bond wire diameter, and module withstand voltage, into account. However, the difficulty of fitting may undoubtedly rise as affected by the excessive number of undetermined coefficients, so it is difficult to apply the Bayerer model in actual projects. The physical lifetime models are models developed based on the physics of failures and have received considerable popularity in the 90s. A physical lifetime model usually starts from the nature of the failure of the IGBT module and considers the strain and fracture process of the material in the working process. In the studies of these lifetime models, common shortcomings are found: (1) The impact of random probability distribution on lifetime is not considered; and (2) Most of the lifetime predictions are made only for a specific failure model of IGBT modules.

SUMMARY

In view of the above defects or requirements for improvement of the related art, the disclosure provides a method and system for predicting an insulated gate bipolar transistor (IGBT) lifetime based on compound failure mode coupling with higher accuracy in lifetime prediction.

To realize the above purpose, according to one aspect of the disclosure, the disclosure provides a method for predicting an IGBT lifetime based on compound failure mode coupling, and the method includes the following steps.

In S1, a simultaneous failure probability model of a bonding wire and a solder layer is calculated from a failure probability distribution of the solder layer and a failure probability distribution of the bonding wire.

In S2, an expectancy of the simultaneous failure probability model is calculated and recorded as a lifetime under a coupling effect.

S3: a difference percentage between a lifetime of the solder layer and a lifetime of the bonding wire is calculated from the failure probability distribution of the solder layer and the failure probability distribution of the bonding wire, and a coupling function relation is established by treating the difference percentage between the lifetime of the solder layer and the lifetime of the bonding wire as an input and treating a lifetime change rate before coupling and after coupling as an output.

S4: The lifetime of the solder layer and the lifetime of the bonding wire are predicted.

S5: An IGBT lifetime prediction model not taking the coupling effect into account is established.

In S6, an IGBT lifetime prediction model taking the coupling effect into account is established, and lifetime prediction is performed by the IGBT lifetime prediction model taking the coupling effect into account.

In some optional embodiments, step S1 further includes the following steps.

In S1.1, $$f_1(N) = \frac{m_1}{\eta_1}\left(\frac{N}{\eta_1}\right)^{m_1-1} e^{-(N/\eta_1)^{m_1}}$$

represents the failure probability distribution of the solder layer, and $$f_2(N) = \frac{m_2}{\eta_2}\left(\frac{N}{\eta_2}\right)^{m_2-1} e^{-(N/\eta_2)^{m_2}}$$

represents the failure probability distribution of the bonding wire, where N is a number of IGBT cycles, $f_1(N)$ is a failure density function of the solder layer, $f_2(N)$ is a failure density function of the bonding wire, $m_1$ is a shape parameter of the failure density function of the solder layer, $m_2$ is a shape parameter of the failure density function of the bonding wire, $n_1$ is a size parameter of the failure density function of the solder layer, and $n_2$ is a size parameter of the failure density function of the bonding wire.

In S1.2, the failure probability distribution of the solder layer and the failure probability distribution of the bonding wire are combined to obtain a simultaneous failure probability model $f_{IGBT}(N)$:

$$f_{IGBT}(N) = e^{-[(N/\eta_1)^{m_1} + (N/\eta_2)^{m_2}]} \left[ \frac{m_1}{\eta_1} \left( \frac{N}{\eta_1} \right)^{m_1-1} + \frac{m_2}{\eta_2} \left( \frac{N}{\eta_2} \right)^{m_2-1} \right]$$

of a IGBT module.

In some optional embodiments, step S2 further includes the following step.

A life expectancy $N_{f\text{-}IGBT}$ of the entire IGBT module is calculated through $$N_{f-IGBT} = \int_0^{+\infty} N e^{-[(N/\eta_1)^{m_1} + (N/\eta_2)^{m_2}]} \left[ \frac{m_1}{\eta_1} \left( \frac{N}{\eta_1} \right)^{m_1-1} + \frac{m_2}{\eta_2} \left( \frac{N}{\eta_2} \right)^{m_2-1} \right] dN.$$

In some optional embodiments, step S3 further includes the following steps.

In S3.1, the shape parameter and the size parameter of the failure probability distribution of the solder layer are changed to obtain the lifetime of the solder layer, the shape parameter and the size parameter of the failure probability distribution of the bonding wire are changed to obtain the lifetime of the bonding wire, and the difference percentage between the lifetime of the solder layer and the lifetime of the bonding wire is calculated through $$\Delta N = \frac{|N_2' - N_1'|}{\min\{N_1', N_2'\}},$$

where $N_1'$ is the lifetime of the solder layer, and $N_2'$ is the lifetime of the bonding wire.

In S3.2, a lifetime change rate $\Delta N_{f\text{-}IGBT}$ before coupling and after coupling is calculated through $$\Delta N_{f-IGBT} = \frac{\min\{N_1', N_2'\} - N_{f-IGBT}}{\min\{N_1', N_2'\}} \times 100\%,$$

where $N_{f\text{-}IGBT}$ is an IGBT lifetime which is obtained by using the simultaneous failure probability model.

In S3.3, by treating the difference percentage between the lifetime of the solder layer and the lifetime of the bonding wire as an input and treating the lifetime change rate before coupling and after coupling as an output, a coupling function relation between $\Delta N_{f\text{-}IGBT}$ and $\Delta N$ is established through fitting.

In some optional embodiments, step S4 further includes the following steps.

In S4.1, the IGBT module is made to perform a power cycle aging experiment under conditions of different junction temperature fluctuations $\Delta T_j$ and average junction temperatures $T_{jm}$ until the IGBT module fails.

In S4.2, IGBT modules that fail due to the solder layer are screened, a lifetime prediction model of the solder layer is established according to temperature conditions and numbers of cycles through $$N_1 = A \Delta T_j^\alpha e^{\frac{E_a}{k_B(T_{jm}+273)}},$$

and the lifetime prediction model of the solder layer predicts and obtains the lifetime $N_1$ of the solder layer, where A and a are constants to be fitted, $E_a$ is activation energy, and $k_B$ is a Boltzmann constant.

In S4.3, IGBT modules that fail due to the bonding wire are screened, a lifetime prediction model of the bonding wire is established according to the temperature conditions and the numbers of cycles through $$N_2 = A \Delta T_j^\alpha e^{\frac{E_a}{k_B(T_{jm}+273)}},$$

and the lifetime prediction model of the bonding wire predicts and obtains the lifetime $N_2$ of the bonding wire.

In some optional embodiments, step S5 further includes the following step.

A lifetime of a portion which fails faster is treated as the lifetime of the entire IGBT module under different temperature conditions, and a lifetime prediction model: $N_{IGBT} = \min\{N_1, N_2\}$ not taking the coupling effect into account is established.

In some optional embodiments, step S6 further includes the following step.

A lifetime of a portion which fails faster is treated as the lifetime of the entire IGBT module under different temperature conditions, and a lifetime prediction model: $N_{IGBT} = (1 - \Delta N_{f\text{-}IGBT}) \min\{N_1, N_2\}$ taking the coupling effect into account is established based on the coupling function relation.

According to another aspect of the disclosure, the disclosure further provides a system for predicting an insulated gate bipolar transistor (IGBT) lifetime based on compound failure mode coupling. The system includes a simultaneous failure probability model building module, a coupling life calculation module, a coupling function building block, a solder layer and bonding wire lifetime calculation module, a first life prediction module establishment module, and a second life prediction module establishment module.

The simultaneous failure probability model building module is configured to calculate a simultaneous failure probability model of a bonding wire and a solder layer from a failure probability distribution of the solder layer and a failure probability distribution of the bonding wire.

The coupling life calculation module is configured to calculate and record an expectancy of the simultaneous failure probability model as a lifetime under a coupling effect.

The coupling function building block is configured to calculate a difference percentage between a lifetime of the solder layer and a lifetime of the bonding wire from the failure probability distribution of the solder layer and the failure probability distribution of the bonding wire and establish a coupling function relation by treating the difference percentage between the lifetime of the solder layer and the lifetime of the bonding wire as an input and treating a lifetime change rate before coupling and after coupling as an output.

The solder layer and bonding wire lifetime calculation module is configured to predict the lifetime of the solder layer and the lifetime of the bonding wire.

The first life prediction module establishment module is configured to establish an IGBT lifetime prediction model not taking the coupling effect into account.

The second life prediction module establishment module is configured to establishing an IGBT lifetime prediction model taking the coupling effect into account and perform lifetime prediction through the IGBT lifetime prediction model taking the coupling effect into account.

According to another aspect of the disclosure, the disclosure further provides a computer readable storage medium storing a computer program. The computer program performs any step of the method when being executed by a processor.

In general, the above technical solutions provided by the disclosure have the following beneficial effects compared with the related art.

(1) When the lifetime of the solder layer is close to the lifetime of the bonding wire, the lifetime of the IGBT module may be accurately predicted due to the coupling effect of the two.

(2) The failure mode of the IGBT module may be predicted, which is conducive to the subsequent management of reliability.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
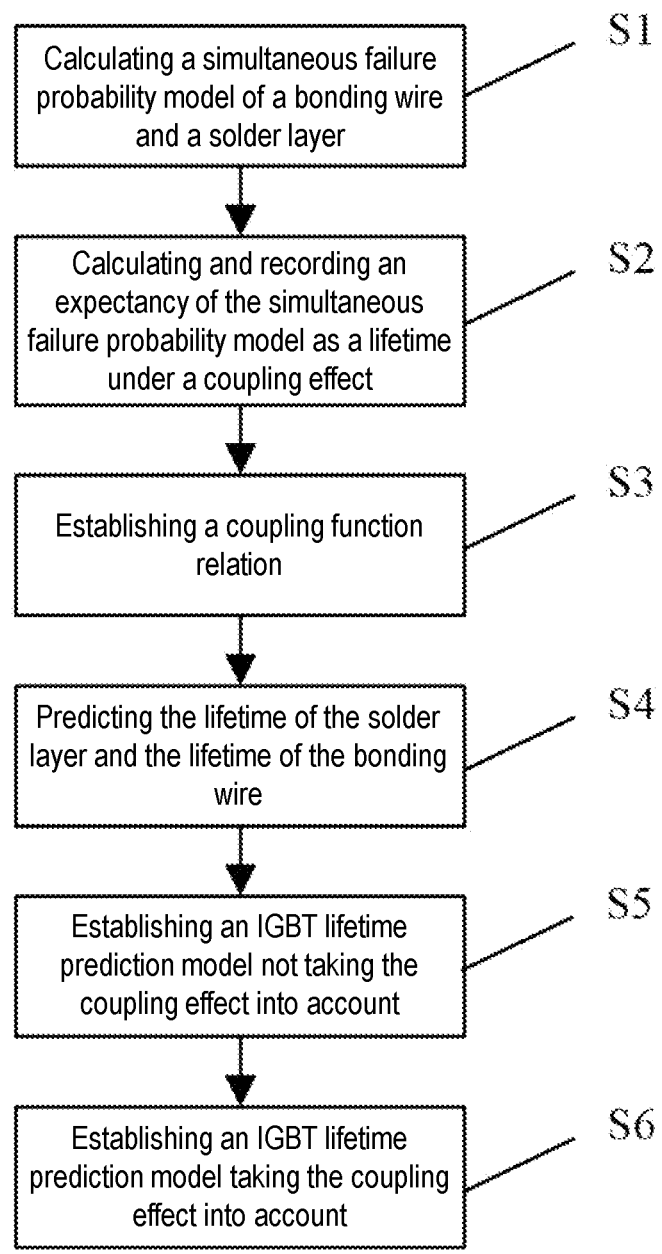
FIG. 1 is a schematic flow chart of a method for predicting an insulated gate bipolar transistor (IGBT) lifetime based on compound failure mode coupling according to an embodiment of the disclosure.

As shown in FIG. 1, which is a schematic flow chart of a method for predicting an insulated gate bipolar transistor (IGBT) lifetime based on compound failure mode coupling according to an embodiment of the disclosure, and the following steps are included.

In S1, a simultaneous failure probability model of a bonding wire and a solder layer is calculated from a failure probability distribution of the solder layer and a failure probability distribution of the bonding wire.

In the embodiments of the disclosure, in step S1, the step of calculating the simultaneous failure probability model of the bonding wire and the solder layer specifically includes the following steps.

In S1.1, $$f_1(N) = \frac{m_1}{\eta_1}\left(\frac{N}{\eta_1}\right)^{m_1-1} e^{-(N/\eta_1)^{m_1}}$$

represents the failure probability distribution of the solder layer, and $$f_2(N) = \frac{m_2}{\eta_2}\left(\frac{N}{\eta_2}\right)^{m_2-1} e^{-(N/\eta_2)^{m_2}}$$

represents the failure probability distribution of the bonding wire, where N is a number of IGBT cycles, $f_1(N)$ is a failure density function of the solder layer, $f_2(N)$ is a failure density function of the bonding wire, $m_1$ is a shape parameter of the failure density function of the solder layer, $m_2$ is a shape parameter of the failure density function of the bonding wire, $n_1$ is a size parameter of the failure density function of the solder layer, and $n_2$ is a size parameter of the failure density function of the bonding wire.

In S1.2, the failure probability distribution of the solder layer and the failure probability distribution of the bonding wire are combined to obtain a simultaneous failure probability model $$f_{IGBT}(N): f_{IGBT}(N) = e^{-[(N/\eta_1)^{m_1} + (N/\eta_2)^{m_2}]} \left[\frac{m_1}{\eta_1}\left(\frac{N}{\eta_1}\right)^{m_1-1} + \frac{m_2}{\eta_2}\left(\frac{N}{\eta_2}\right)^{m_2-1}\right]$$

of a IGBT module.

In S2, an expectancy of the simultaneous failure probability model is calculated and recorded as a lifetime under a coupling effect.

In the embodiments of the disclosure, in step S2, the step of calculating and recording the expectancy of the simultaneous failure probability model as the lifetime under the coupling effect specifically includes the following step.

A life expectancy $N_{f\text{-}IGBT}$ of the entire IGBT module is calculated through $$N_{f-IGBT} = \int_0^{+\infty} N e^{-[(N/\eta_1)^{m_1} + (N/\eta_2)^{m_2}]} \left[\frac{m_1}{\eta_1}\left(\frac{N}{\eta_1}\right)^{m_1-1} + \frac{m_2}{\eta_2}\left(\frac{N}{\eta_2}\right)^{m_2-1}\right] dN.$$

In S3, a coupling function relation is established.

In the embodiments of the disclosure, in step S3, the step of establishing the coupling function relation specifically includes the following steps.

In S3.1, the shape parameter and the size parameter of the failure probability distribution of the solder layer are changed to obtain the lifetime of the solder layer, the shape parameter and the size parameter of the failure probability distribution of the bonding wire are changed to obtain the lifetime of the bonding wire, and the difference percentage between the lifetime of the solder layer and the lifetime of the bonding wire is calculated through $$\Delta N = \frac{|N_2' - N_1'|}{\min\{N_1', N_2'\}},$$

where $N_1'$ is the lifetime of the solder layer, and $N_2'$ is the lifetime of the bonding wire.

In S3.2: a lifetime change rate $\Delta N_{f\text{-}IGBT}$ before coupling and after coupling is calculated through $$\Delta N_{f-IGBT} = \frac{\min\{N_1', N_2'\} - N_{f-IGBT}}{\min\{N_1', N_2'\}} \times 100\%,$$

where $N_{f\text{-}IGBT}$ is an IGBT lifetime which is obtained by using the simultaneous failure probability model.

In S3.3, by treating the difference percentage between the lifetime of the solder layer and the lifetime of the bonding wire as an input and treating the lifetime change rate before coupling and after coupling as an output, a coupling function relation between $\Delta N_{f\text{-}IGBT}$ and $\Delta N$ is established through fitting.

Figure 2:
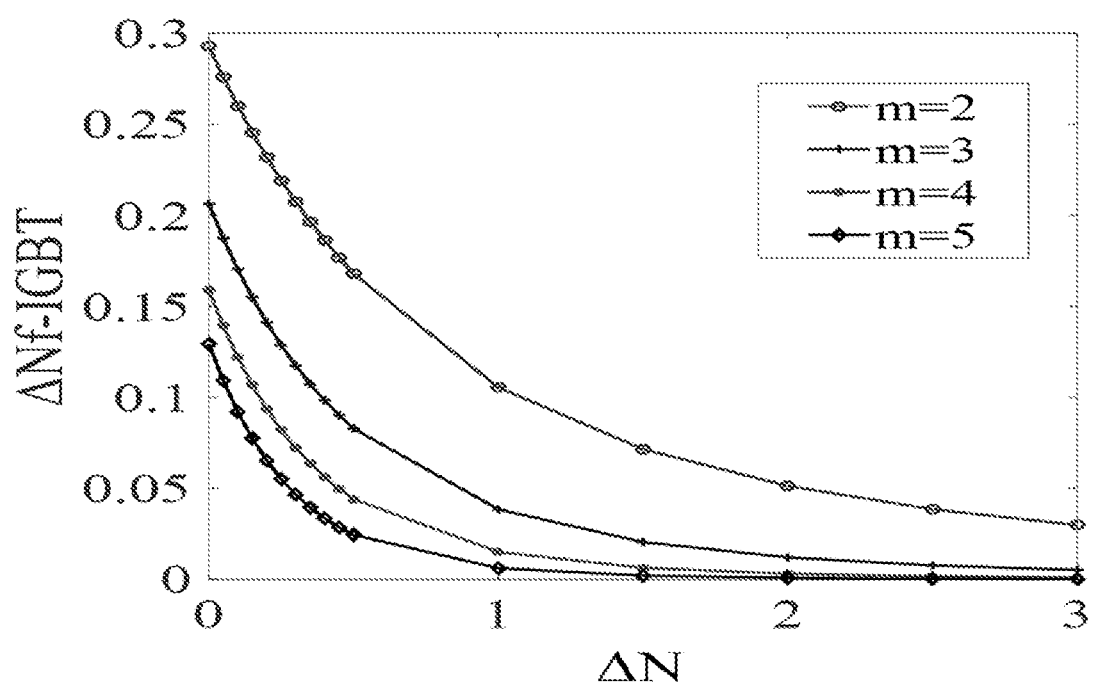
FIG. 2 is a lifetime prediction model according to an embodiment of the disclosure.

Here in, the coupling function relation is shown in FIG. 2 and is fitted to obtain the coupling function relation: $\Delta N_{f\text{-}IGBT}=(0.8004e^{-471m}+0.1165)\cdot e^{(0.5464-0.7869m)\cdot\Delta N}$, where m represents the shape parameter in the failure probability distribution, which is generally obtained through statistics of aging experiment data.

S4: The lifetime of the solder layer and the lifetime of the bonding wire are predicted.

In the embodiments of the disclosure, in step S4, the step of predicting the lifetime of the solder layer and the lifetime of the bonding wire specifically includes the following steps.

In S4.1, an aging experiment is performed on the IGBT module under different temperature conditions.

To be specific, the IGBT module is made to perform a power cycle aging experiment under conditions of different junction temperature fluctuations $\Delta T_j$ and average junction temperatures $T_{jm}$ until the IGBT module fails. A number of failure cycles of the IGBT module and the corresponding IGBT module thereof are counted.

In S4.2, IGBT modules that fail due to the solder layer are screened, a lifetime prediction model of the solder layer is established according to temperature conditions and numbers of cycles through $$N_1 = A\Delta T_j^\alpha e^{\frac{E_a}{k_B(T_{jm}+273)}},$$

and the lifetime prediction model of the solder layer predicts and obtains the lifetime $N_1$ of the solder layer, where A and a are constants to be fitted, $E_a$ is activation energy, and $k_B$ is a Boltzmann constant.

In S4.3, IGBT modules that fail due to the bonding wire are screened, a lifetime prediction model of the bonding wire is established according to the temperature conditions and the numbers of cycles through $$N_2 = A\Delta T_j^\alpha e^{\frac{E_a}{k_B(T_{jm}+273)}},$$

and the lifetime prediction model of the bonding wire predicts and obtains the lifetime $N_2$ of the bonding wire.

S5: An IGBT lifetime prediction model not taking the coupling effect into account is established.

In the embodiments of the disclosure, in step S5, the step of establishing the IGBT lifetime prediction model not taking the coupling effect into account specifically includes the following step.

A lifetime of a portion which fails faster is treated as the lifetime of the entire IGBT module under different temperature conditions, and a lifetime prediction model: $N_{IGBT}=\min\{N_1,N_2\}$ not taking the coupling effect into account is established.

In S6, an IGBT lifetime prediction model taking the coupling effect into account is established, and lifetime prediction is performed by the IGBT lifetime prediction model taking the coupling effect into account.

In the embodiments of the disclosure, in step S6, the step of establishing the IGBT lifetime prediction model taking the coupling effect into account specifically includes the following step.

A lifetime of a portion which fails faster is treated as the lifetime of the entire IGBT module under different temperature conditions, and a lifetime prediction model: $N_{IGBT}=(1-\Delta N_{f\text{-}IGBT})\min\{N_1, N_2\}$ taking the coupling effect into account is established based on the coupling function relation.

The disclosure further provides a system for predicting an insulated gate bipolar transistor (IGBT) lifetime based on compound failure mode coupling. The system includes a simultaneous failure probability model building module, a coupling life calculation module, a coupling function building block, a solder layer and bonding wire lifetime calculation module, a first life prediction module establishment module, and a second life prediction module establishment module.

The simultaneous failure probability model building module is configured to calculate a simultaneous failure probability model of a bonding wire and a solder layer from a failure probability distribution of the solder layer and a failure probability distribution of the bonding wire.

The coupling life calculation module is configured to calculate and record an expectancy of the simultaneous failure probability model as a lifetime under a coupling effect.

The coupling function building block is configured to calculate a difference percentage between a lifetime of the solder layer and a lifetime of the bonding wire from the failure probability distribution of the solder layer and the failure probability distribution of the bonding wire and establish a coupling function relation by treating the difference percentage between the lifetime of the solder layer and the lifetime of the bonding wire as an input and treating a lifetime change rate before coupling and after coupling as an output.

The solder layer and bonding wire lifetime calculation module is configured to predict the lifetime of the solder layer and the lifetime of the bonding wire.

The first life prediction module establishment module is configured to establish an IGBT lifetime prediction model not taking the coupling effect into account.

The second life prediction module establishment module is configured to establishing an IGBT lifetime prediction model taking the coupling effect into account and perform lifetime prediction through the IGBT lifetime prediction model taking the coupling effect into account.

Herein, specific implementation of each of the modules may be found with reference to the description provided above, and description thereof is not repeated in the embodiments of the disclosure.

Note that according to implementation requirements, each step/part described in the disclosure may be further divided into more steps/parts, or two or more steps/parts or partial operations of a step/part may be combined into a new step/part to accomplish the goal of the disclosure.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method for predicting an insulated gate bipolar transistor (IGBT) lifetime based on compound failure mode coupling, comprising:
   S1: calculating a simultaneous failure probability model of a bonding wire and a solder layer from a failure probability distribution of the solder layer and a failure probability distribution of the bonding wire;

In S2, calculating and recording an expectancy of the simultaneous failure probability model as a lifetime under a coupling effect;

S3: calculating a difference percentage between a lifetime of the solder layer and a lifetime of the bonding wire from the failure probability distribution of the solder layer and the failure probability distribution of the bonding wire, establishing a coupling function relation by treating the difference percentage between the lifetime of the solder layer and the lifetime of the bonding wire as an input and treating a lifetime change rate before coupling and after coupling as an output;

S4: predicting the lifetime of the solder layer and the lifetime of the bonding wire; wherein the step 4 further comprises: S4.1: making the IGBT circuit perform a power cycle aging experiment under conditions of different junction temperature fluctuations $\Delta T_j$ and average junction temperatures $T_{jm}$ until the IGBT circuit fails;

S5: establishing an IGBT lifetime prediction model not taking the coupling effect into account; and S6: establishing an IGBT lifetime prediction model taking the coupling effect into account, performing lifetime prediction through the IGBT lifetime prediction model taking the coupling effect into account;

when the lifetime of the solder layer is close to the lifetime of the bonding wire, the lifetime of the IGBT circuit be predicted due to the coupling effect of the two;

wherein a failure mode of the IGBT circuit be predicted, which is conducive to the subsequent management of reliability.

2. The method according to claim 1, wherein step S1 further comprises:

S1.1: representing the failure probability distribution of the solder layer through $$f_1(N) = \frac{m_1}{\eta_1}\left(\frac{N}{\eta_1}\right)^{m_1-1} e^{-(N/\eta_1)^{m_1}},$$

representing the failure probability distribution of the bonding wire through $$f_2(N) = \frac{m_2}{\eta_2}\left(\frac{N}{\eta_2}\right)^{m_2-1} e^{-(N/\eta_2)^{m_2}},$$

wherein N is a number of IGBT cycles, $f_1(N)$ is a failure density function of the solder layer, $f_2(N)$ is a failure density function of the bonding wire, $m_1$ is a shape parameter of the failure density function of the solder layer, $m_2$ is a shape parameter of the failure density function of the bonding wire, $n_1$ is a size parameter of the failure density function of the solder layer, and $n_2$ is a size parameter of the failure density function of the bonding wire; and S1.2: combining the failure probability distribution of the solder layer and the failure probability distribution of the bonding wire to obtain a simultaneous failure probability model $$f_{IGBT}(N) : f_{IGBT}(N) = e^{-[(N/\eta_1)^{m_1} + (N/\eta_2)^{m_2}]} \left[\frac{m_1}{\eta_1}\left(\frac{N}{\eta_1}\right)^{m_1-1} + \frac{m_2}{\eta_2}\left(\frac{N}{\eta_2}\right)^{m_2-1}\right]$$

of a IGBT circuit.

3. The method according to claim 2, wherein step S2 further comprises:

calculating a life expectancy $N_{f-IGBT}$ of the entire IGBT circuit through $$N_{f-IGBT} = \int_0^{+\infty} Ne^{-[(N/\eta_1)^{m_1} + (N/\eta_2)^{m_2}]} \left[\frac{m_1}{\eta_1}\left(\frac{N}{\eta_1}\right)^{m_1-1} + \frac{m_2}{\eta_2}\left(\frac{N}{\eta_2}\right)^{m_2-1}\right] dN.$$

4. The method according to claim 3, wherein step S3 further comprises:

S3.1: changing the shape parameter and the size parameter of the failure probability distribution of the solder layer to obtain the lifetime of the solder layer, changing the shape parameter and the size parameter of the failure probability distribution of the bonding wire to obtain the lifetime of the bonding wire, calculating the difference percentage between the lifetime of the solder layer and the lifetime of the bonding wire through $$\Delta N = \frac{|N_2' - N_1'|}{\min\{N_1', N_2'\}},$$

wherein $N_1'$ is the lifetime of the solder layer, and $N_2'$ is the lifetime of the bonding wire;

S3.2: calculating the lifetime change rate $\Delta N_{f-IGBT}$ before coupling and after coupling through $$\Delta N_{f-IGBT} = \frac{\min\{N_1', N_2'\} - N_{f-IGBT}}{\min\{N_1', N_2'\}} \times 100\%,$$

wherein $N_{f-IGBT}$ is an IGBT lifetime which is obtained by using the simultaneous failure probability model; and S3.3: establishing the coupling function relation between $\Delta N_{f-IGBT}$ and $\Delta N$ through fitting by treating the difference percentage between the lifetime of the solder layer and the lifetime of the bonding wire as the input and treating the lifetime change rate before coupling and after coupling as the output.

5. The method according to claim 4, wherein step S4 further comprises:

S4.2: screening IGBT circuits that fail due to the solder layer, establishing a lifetime prediction model of the solder layer according to temperature conditions and numbers of cycles through $$N_1 = A\Delta T_j^a e^{\frac{E_a}{k_B(T_{jm}+273)}},$$

predicting and obtaining, by the lifetime prediction model of the solder layer, the lifetime $N_1$ of the solder layer, wherein A and a are constants to be fitted, $E_a$ is activation energy, and $k_B$ is a Boltzmann constant; and S4.3: screening IGBT circuits that fail due to the bonding wire, establishing a lifetime prediction model of the bonding wire according to the temperature conditions and the numbers of cycles through $$N_2 = A\Delta T_j^a e^{\frac{E_a}{k_B(T_{jm}+273)}},$$

predicting and obtaining, by the lifetime prediction model of the bonding wire, the lifetime $N_2$ of the bonding wire.

6. The method according to claim 5, wherein step S5 further comprises:
treating a lifetime of a portion which fails faster as the lifetime of the entire IGBT circuit under different temperature conditions, establishing the IGBT lifetime prediction model: $N_{IGBT}=\min\{N_1,N_2\}$ not taking the coupling effect into account.

7. The method according to claim 6, wherein step S6 further comprises:
treating the lifetime of the portion which fails faster as the lifetime of the entire IGBT circuit under the different temperature conditions, establishing the IGBT lifetime prediction model: $N_{IGBT}=(1-\Delta N_{f\text{-}IGBT})\min\{N_1,N_2\}$ taking the coupling effect into account based on the coupling function relation.

8. A non-transitory computer-readable storage medium, provided with a computer program, wherein the computer program executes the steps of the method according to claim 1 when being executed by a processor.

9. A non-transitory computer-readable storage medium, provided with a computer program, wherein the computer program executes the steps of the method according to claim 2 when being executed by a processor.

10. A non-transitory computer-readable storage medium, provided with a computer program, wherein the computer program executes the steps of the method according to claim 3 when being executed by a processor.

11. A non-transitory computer-readable storage medium, provided with a computer program, wherein the computer program executes the steps of the method according to claim 4 when being executed by a processor.

12. A non-transitory computer-readable storage medium, provided with a computer program, wherein the computer program executes the steps of the method according to claim 5 when being executed by a processor.

13. A non-transitory computer-readable storage medium, provided with a computer program, wherein the computer program executes the steps of the method according to claim 6 when being executed by a processor.

14. A non-transitory computer-readable storage medium, provided with a computer program, wherein the computer program executes the steps of the method according to claim 7 when being executed by a processor.

* * * * *